United States Patent [19]
Schaafsma et al.

[11] Patent Number: 5,949,935
[45] Date of Patent: Sep. 7, 1999

[54] INFRARED OPTICAL FIBER COUPLER

[75] Inventors: David T. Schaafsma, Arlington, Va.; Jasbinder S. Sanghera, Greenbelt, Md.

[73] Assignee: The United States of America as represented by the Secretary of the Navy, Washington, D.C.

[21] Appl. No.: 08/980,020

[22] Filed: Nov. 26, 1997

[51] Int. Cl.⁶ .................................................. G02B 6/26
[52] U.S. Cl. .............................................. 385/43; 65/389
[58] Field of Search ............................. 385/43, 147, 95, 385/96; 65/30.1, 32.4, 389, 409, 432; 372/6

[56] References Cited

U.S. PATENT DOCUMENTS

| | | | |
|---|---|---|---|
| 3,901,996 | 8/1975 | Hasegawa et al. | 65/30.1 |
| 4,648,892 | 3/1987 | Kittrell et al. | 65/387 |
| 4,652,288 | 3/1987 | Saito | 65/389 |
| 4,908,053 | 3/1990 | Nishii et al. | 65/389 |
| 5,042,039 | 8/1991 | Edagawa et al. | 372/6 |
| 5,283,846 | 2/1994 | Toyonaka et al. | 385/27 |
| 5,329,602 | 7/1994 | Mori et al. | 385/43 |
| 5,343,544 | 8/1994 | Boyd et al. | 385/46 |
| 5,404,415 | 4/1995 | Mori et al. | 385/43 |
| 5,410,626 | 4/1995 | Okuta et al. | 385/39 |
| 5,420,950 | 5/1995 | Koya et al. | 385/43 |
| 5,448,673 | 9/1995 | Murphy et al. | 385/123 |
| 5,524,157 | 6/1996 | Yodo et al. | 385/42 |
| 5,524,158 | 6/1996 | Button et al. | 385/51 |
| 5,562,839 | 10/1996 | Pan | 216/26 |

OTHER PUBLICATIONS

Publication, "Connectors, Splices, and Couplers for Infrared Transmitting and Optical Fibers" by O. Eyal et al., Applied Optics, vol. 36, No. 6, Feb. 20, 1997, pp. 1185–1190.

Publication, Infrared Evanescent Absorption Spectroscopy of Toxic Chemicals Using Chalcogenide Glass Fibers by Jas S. Sanahera et al., Journal of the American Ceramic Society, vol. 78, No. 8, Aug. 1995, pp. 2198–2202.

Publication, "Reflection Intensity Optical Fiber Sensors for the Mid–Infrared" by I Tugendhaft et al., Applied Optics, vol. 36, No. 6, Feb. 20, 1997, pp. 1297–1302.

*Primary Examiner*—Akm E. Ullah
*Attorney, Agent, or Firm*—Thomas E. McDonnell; George Jameson

[57] ABSTRACT

An infrared fiber optic coupler and a method for making an infrared fiber optic coupler are disclosed. The method comprises the steps of: braiding first and second infrared transmitting glass fibers to form first and second arms of the infrared fiber optic coupler; inserting the braided first and second infrared transmitting glass fibers through a furnace; securing the braided glass fibers by two clamping mechanisms on first and second sides of the furnace; purging the furnace of water vapor and oxygen with a steady flow of inert gas through the furnace; allowing infrared light to pass through one of the first and second arms of the coupler; detecting the infrared signals from the first and second arms of the coupler in first and second infrared detectors; comparing the detected signals to develop a coupling ratio between the first and second arms of the coupler; turning the furnace on to heat the first and second braided glass fibers to the point where the glass fibers begin to darken in color; translating the second clamping mechanism to produce a tautness on the first and second braided glass fibers until the desired coupling ratio has been achieved; turning the furnace off; maintaining tension on the first and second braided glass fibers until the fibers cool to rigidity; and turning off the gas flow.

17 Claims, 6 Drawing Sheets

FIG. 5

INFRARED OPTICAL FIBER COUPLER

BACKGROUND OF THE INVENTION

1. Field of the Invention

The present invention relates to fiber optic couplers and particularly to a novel infrared fiber optic coupler, useful in multiplexing and demultiplexing optical data, creating components for communications systems including add/drop devices, amplifiers and oscillators, making hybrid or multi-element sensors, and for fiber interferometry. Optical couplers represent one of the fundamental building blocks for sophisticated optical fiber devices, which have not yet been made for mid-infrared (about 1.5–12 μm) operation.

2. Description of the Related Art

Many processes exist and are employed to make fiber coupler devices which are suited for operation in the visible spectrum or the near-infrared (<1.6 μm), most commonly utilizing silica fibers; the fusion technique has been employed in making fiber couplers from silica glass fibers for over two decades. Yet these kind of devices are not available in the mid-infrared at present, largely due to the lack of methodology and knowledge for making basic components such as couplers from chalcogenide or other infrared-transmitting glass fibers, and due to the inadequate quality of the fiber that has been produced in the past.

With the availability of high-quality chalcogenide fiber, the fabrication of these devices has become feasible. Just as chalcogenide fibers have advantages in the infrared over standard silica glass fibers, devices made from these infrared fibers should show marked performance improvement over any device made with silica fiber. Infrared fiber devices, using fiber couplers, can now be fabricated for applications in chemical sensing, data transmission, and infrared spectroscopy.

There are three common elements to the majority of coupler fabrication processes which utilize thermal fusion: etching or surface preparation, heating, and mechanical bonding. There are several important differences in fusion coupling (defined as heating and mechanical bonding) of chalcogenide glasses versus silica glass, which can be summarized as follows:

1. Etching and Surface Preparation
   a) Chalcogenide compounds cannot be etched with hydrofluoric acid, as is the common practice with silicates. Alternative etchants such as KOH must be used.
   b) In silicates, the surface oxidation is not a major concern during the fusion process, since most of these compounds contain oxygen as a primary constituent. In chalcogenides, surface oxides form an entirely new compound which inhibits wetting, surface contact, and which form an optical barrier in the waveguide. This layer can be removed in a reactive atmosphere or by plasma treatment.
2. Thermal Mechanics
   a) The melting and softening temperatures of the chalcogenide glass are substantially lower than the melting temperature of silica, so open flame heating systems cannot be used.
   b) Chalcogenides are much more susceptible to oxidation than silica, and thus the process must be performed in an inert atmosphere, other than oxygen-containing atmospheres (e.g. halogen atmospheres).
   c) The viscosity profile as a function of temperature is steeper in chalcogenides than in silica, so the range of temperatures over which the fusion can be achieved is narrower. The temperature or viscosity range for the fusion process is particularly important since these chalcogenide compositions are highly susceptible to interdiffusion of the core and cladding material at elevated temperatures.
   d) The higher vapor pressure of chalcogenides at elevated temperatures leads to greater volatilization of the glass constituents, the loss of which impairs the optical and mechanical performance of the fiber. This means that close control of temperature in this process is important and necessary.
3. Mechanical Considerations
   a) The more fragile chalcogenide fiber requires different handling and tensioning procedures than mandated by the established silica process, particularly when twisted to achieve overlap between the fibers.
   b) The compositional range of the chalcogenide glasses allows for a greater variation in the numerical aperture of the fiber, which determines the magnitude of the evanescent field outside the core. Since the coupling in these devices is largely evanescent, and driven by bends or twists in the fiber where light can escape more easily, this variability means that the chalcogenide fiber coupler fabrication process can tolerate a wider range of bend radii in the fiber and hence more or fewer twists of the fiber.
   c) The higher refractive index of chalcogenide glass ensures greater light guiding even in core-only material, so that slight air gaps in the coupler body result in much lower losses.

A multimode "coupler" made from chalcogenide glass has been fabricated previously, but this device employed core-only fiber, and did not actually fuse the fibers together. The performance of this device is also affected by atmospheric conditions. The device described in this application uses core-clad fiber, which has inherently lower losses and is greatly preferred over core-only fiber in making sensing and communications devices.

SUMMARY OF THE INVENTION

Accordingly, it is an object of the present invention to provide a new infrared fiber optic coupler and a method for making the new infrared fiber optic coupler.

Another object of the invention is to provide an infrared fiber optic coupler in which two infrared light beams can be placed in the same infrared transmitting fiber.

A further object of the invention is to provide an infrared fiber optic coupler which can split one infrared light beam into two infrared light beams.

These and other objects of this invention are achieved by providing an infrared fiber optic coupler and a method for making an infrared fiber optic coupler. The method comprises the steps of: braiding first and second infrared transmitting glass fibers to form first and second arms of the infrared fiber optic coupler; inserting the braided first and second infrared transmitting glass fibers through a furnace; securing the braided glass fibers by two clamping mechanisms on first and second sides of the furnace; purging the furnace of water vapor and oxygen with a steady flow of inert gas through the furnace; allowing infrared light to pass through one of the first and second arms of the coupler; detecting the infrared signals from the first and second arms of the coupler in first and second infrared detectors; comparing the detected signals to develop a coupling ratio between the first and second arms of the coupler; turning the furnace on to heat the first and second braided glass fibers to the point where the glass fibers begin to darken in color; translating the second clamping mechanism to produce a tautness on the first and second braided glass fibers until the desired coupling ratio has been achieved; turning the furnace off; maintaining tension on the first and second braided glass fibers until the fibers cool to rigidity; and turning off the gas flow.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENT

Figure 1:
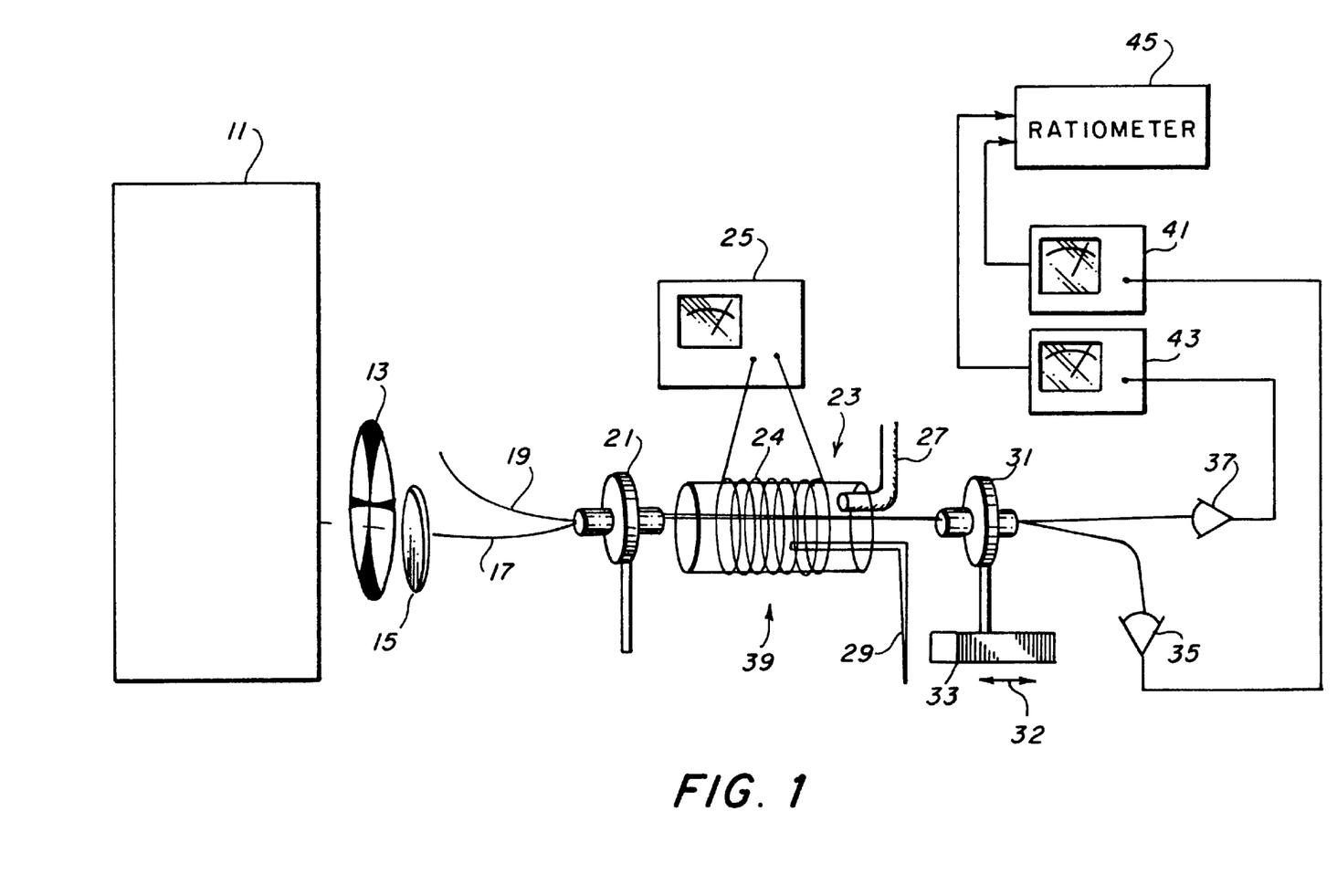
FIG. 1 illustrates an apparatus for making and testing a fused multimode fiber coupler (135 $\mu$m $As_{40}S_{58}Se_2$ core, 200 $\mu$m $As_{40}S_{60}$ cladding)

Referring now to the drawings, a fused multimode fiber coupler 39 (135 $\mu$m $As_{40}S_{58}Se_2$ core, 200 $\mu$m $As_{40}S_{60}$ cladding) was made and tested using the apparatus shown in FIG. 1. It should be noted at this time that this same technique is also applicable to singlemode chalcogenide fiber and to chalcohalide compositions, including fibers doped with rare earths or transition metals.

Before the operation of the apparatus of FIG. 1 is discussed, additional information on chalcogenide and chalcohalide glasses will now be discussed. Components of exemplary fiber material glass compositions of chalcogenide-based infrared optical fibers are shown in FIG. 2A, while components of exemplary fiber glass compositions of chalcohalide-based infrared optical fibers are shown in FIG. 2B.

Figure 2A:
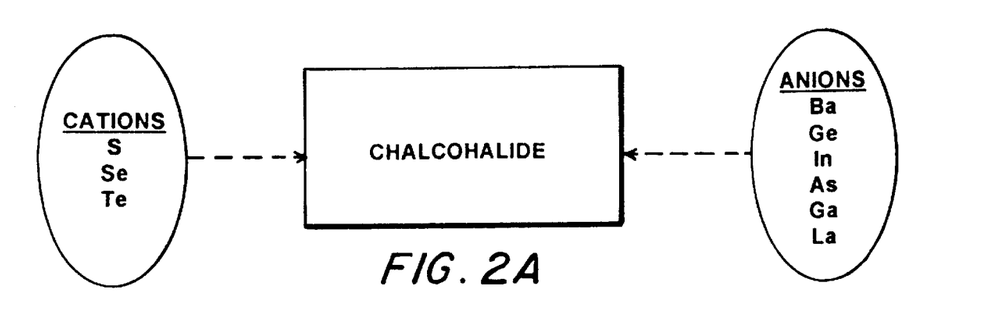
FIGS. 2A & 2B illustrate exemplary fiber material compositions of chalcogenide and chalcohalide based infrared optical fibers, including fibers doped with rare earths or transition metals.

As indicated in FIG. 2A, the chalcogenide glass compositions include any glass composed of at least one of the anions sulfur (S), selenium (Se) and tellurium (Te) and at least one suitable cation, including but not limited to barium (Ba), germanium (Ge), indium (In), arsenic (As), gallium (Ga), or lanthanium (La) in binary, ternary, quaternary, etc. mixtures. Example chalcogenide glass compositions include $As_{40}S_{60}$, $As_{40}S_{55}Se_5$, and $Ge_{33}As_{12}Se_{55}$.

Figure 2B:
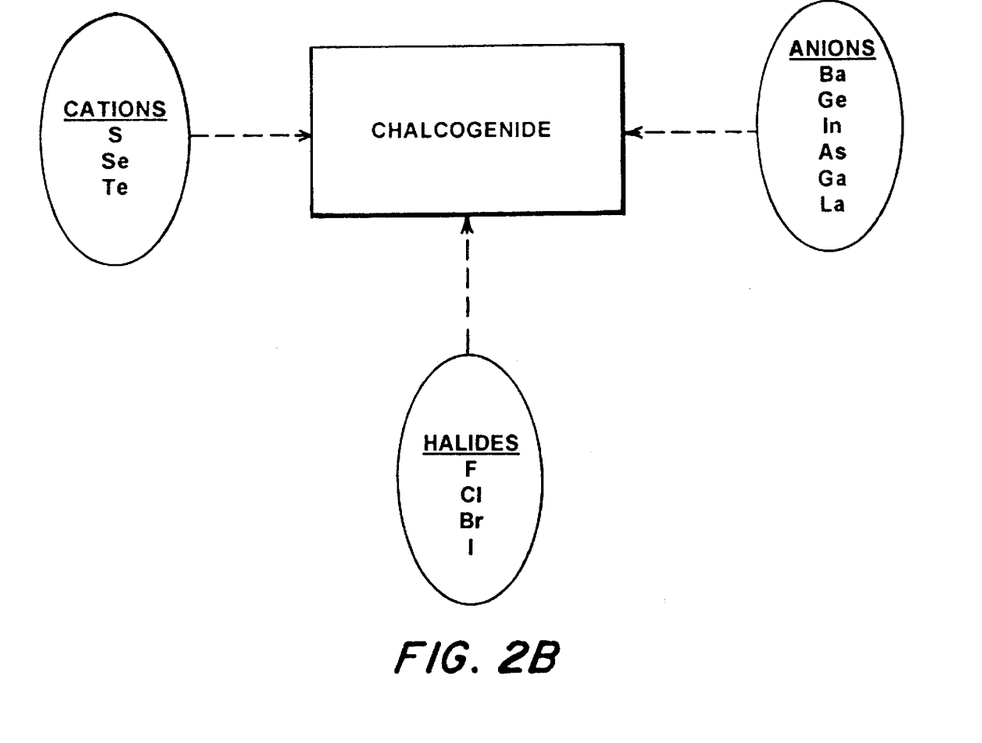

As indicated in FIG. 2B, the chalcohalide glass compositions include any glass composed of at least one of each of the aforementioned cations and anions, plus at least one of the halides (but less than a total of 50 weight percent) of chlorine (Cl), fluorine (F), bromine (Br) and iodine (I).

It is intended that all compositions of the chalcogenide and chalcohalide glasses that form a stable glass are included in the claimed invention.

Referring back to FIG. 1, in operation, fibers 17 and 19 are either bare fibers or coated fibers that have been stripped and cleaned, at least over the portion which will form a new infrared fiber optic coupler 39 when subsequently heated. The fibers 17 and 19 are braided and threaded through a resistively-heated furnace 23, which is purged with a steady flow of inert gas, such as nitrogen, from a small tube 27. A heater winding 24 is coiled around a center portion of the outer circumference of the furnace 23. The furnace 23 was made from ordinary silica tubing and measured approximately 5 centimeters (cm) in length, with a hot zone (heater winding 24) of approximately 2 cm. The current into the heater winding 24 of the furnace 23 was controlled by a standard DC current supply 25 and the temperature was read with a 0.2 mm gauge Pt-Rh (platnium-rhodium) thermocouple 29.

The fibers 17 and 19 were held securely by two clamping mechanisms 21 and 31 on either side of the furnace 23, with the exemplary clamping mechanism 31 being attached to a translation stage 33. The translation stage 33 is capable of translating the clamping mechanism 31, and therefore the fibers 17 and 19, in the directions of arrows 32 in order to produce tension in the fibers 17 and 19. Such translation can be accomplished by manually moving the translation stage 32, by turning a micrometer (not shown) or a screw adjustment (not shown), or by any other suitable means. Due to the fragility of the chalcogenide glass, it is preferrable in this case to braid the fibers 17 and 19 before clamping them, rather than twisting them in situ as is normally done with silica fibers.

The measurement of the optical properties of the coupler 39 being made is achieved with the use of detectors 35 and 37, one for each arm of the coupler 39, and an infrared source or a wideband optical source 11 to couple light from the light source 11 through the objective lens 15 into the input fiber arm 17 of the coupler 39. In this case, an exemplary laser operating at 2.65 $\mu$m was used as the light source 11, and the signal from the light source 11 was modulated or chopped by chopper 13 and read by InSb (indium antimonide) or MCT (mercury, cadmium, telluride) detectors 35 and 37 and fed into lock-in amplifiers 41 and 43 to obtain voltage readings for the outputs of detectors 35 and 37. The voltage outputs of the lock-in amplifiers 41 and 43 were then applied to a ratiometer 45 to develop the coupling ratio of the coupler 39. The detectors 35 and 37 were calibrated against each other to eliminate detector errors.

After the purge flow had been established and allowed to run for some time to thoroughly rid the chamber of the furnace 23 of water vapor and oxygen, the furnace 23 was turned on to heat the fibers 17 and 19. Both fibers 17 and 19 should be taut but not tensioned when the heat cycle begins. The fibers 17 and 19 should then be heated to the point where the glass just begins to darken (turning from semi-translucent to opaque or from red to slightly dark for the glass specified here), a temperature of approximately 250 degrees C. Care must be taken not to allow the fibers 17 and 19 to sag too much while the fibers soften. This must be determined for each fiber composition.

When the fibers 17 and 19 begin to be heated, they start to fuse together at the portion of those fibers that is being heated by the heater winding 24. At this time, light in the fiber 17 begins to be coupled into the fiber 19 to begin to establish a coupling ratio between the fibers 17 and 19, as indicated by the ratiometer 45.

Once the fibers 17 and 19 have softened sufficiently, tension should be applied and allowed to continue until the desired coupling ratio, such as 2:1 or 3:1 has been read out of the ratiometer 45. Real-time monitoring is accomplished easily by injecting the probe beam while the fusing is being done. To stop the fusion process, the furnace 23 should be turned off and the tension on the fibers 17 and 19 maintained for a short time until the fibers 17 and 19 cool to rigidity. When the fibers 17 and 19 have changed back to their original color, the fibers 17 and 19 have cooled to rigidity and the tension should be removed from the fibers 17 and 19 and the nitrogen purge flow can be stopped. Rapid shutoff of the heat is obviously desirable when a precise coupling ratio is needed.

Using this system, the inventors have achieved a 3.3:1 infrared optical fiber coupler with less than 0.3 dB insertion loss. Shown in FIG. 3 are images of the fiber 17 and 19 outputs in FIG. 1 before and after the fusion process, showing that the guided mode in the fiber 17 (FIG. 3A) retains its character in both the direct (FIG. 3B) and split-off (FIG. 3C) beams after the fibers 17 and 19 have been fused.

Figure 3A:
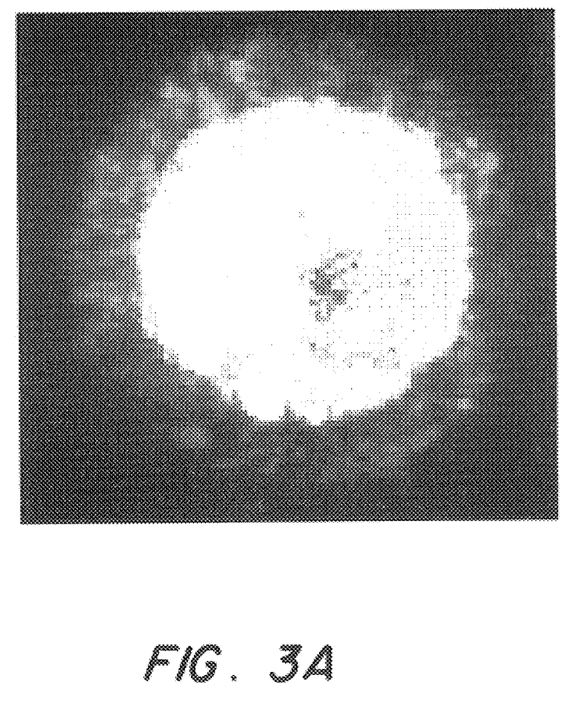
FIGS. 3A, 3B and 3C show images useful in explaining the operation of the apparatus of FIG. 1.

More specifically, FIG. 3A shows the infrared image of the light (direct beam) in the fiber 17 before the fusion process, showing the light guided in the core of the fiber 17.

Figure 3B:
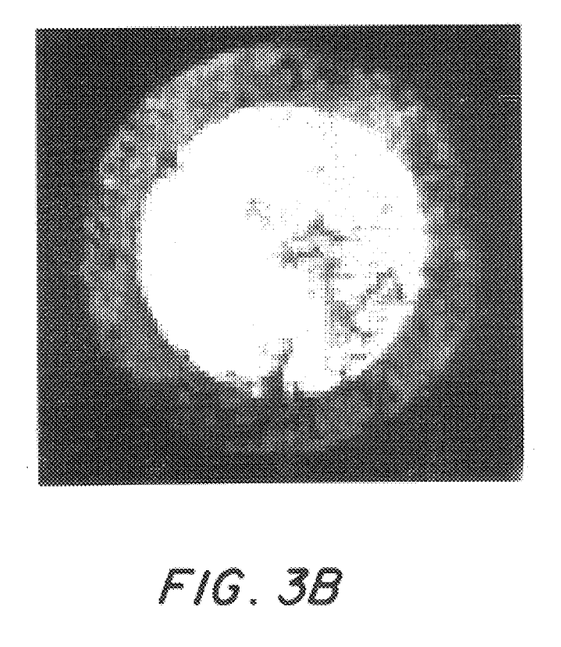

FIG. 3B shows the infrared image of the beam coming out of the direct arm 17 of the coupler 39 after the fibers 17 and 19 were fused. The core image is saturated to allow identification of the cladding layer.

Figure 3C:
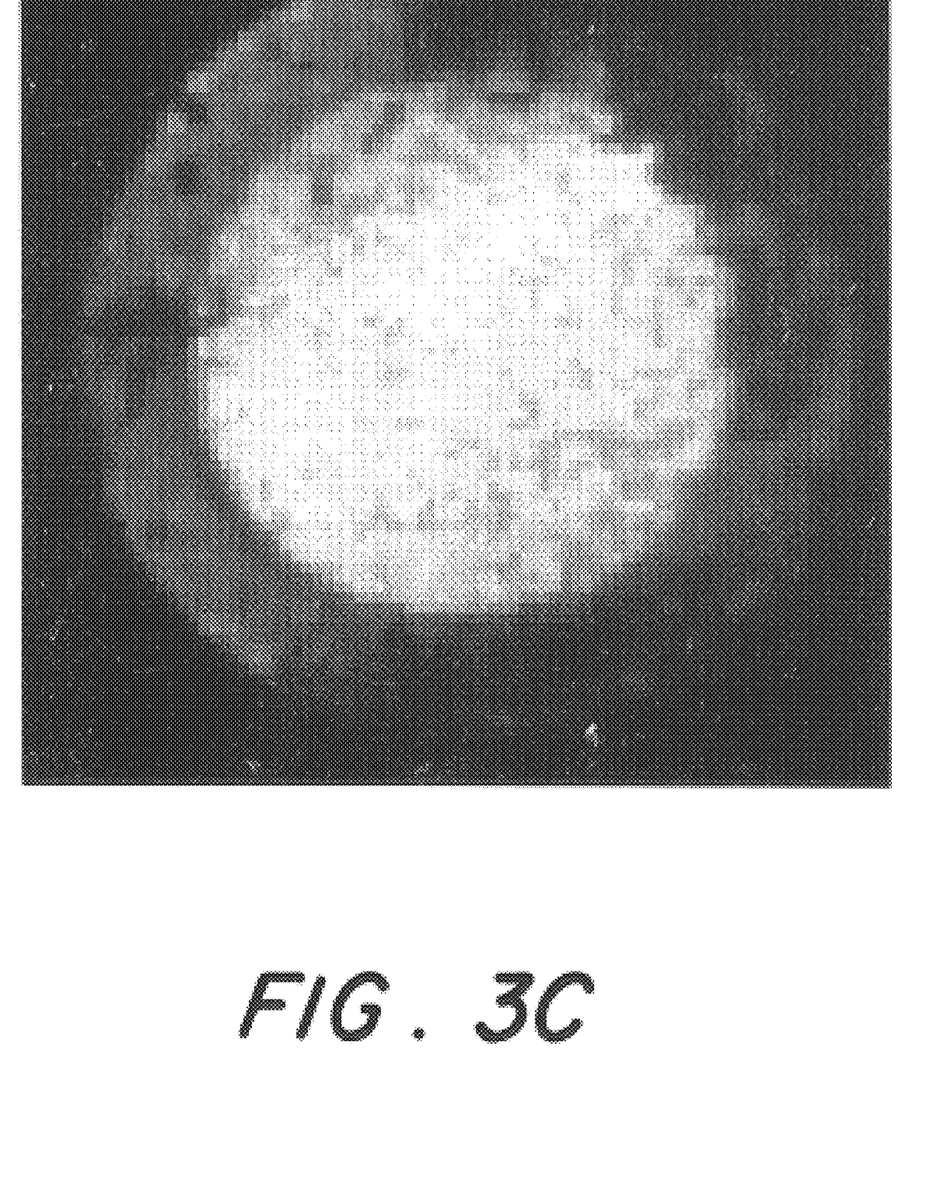

FIG. 3C shows the infrared image of the split beam, coupled into the second arm 19 of the coupler 39, showing how the guided modes have been preserved.

Figure 4:
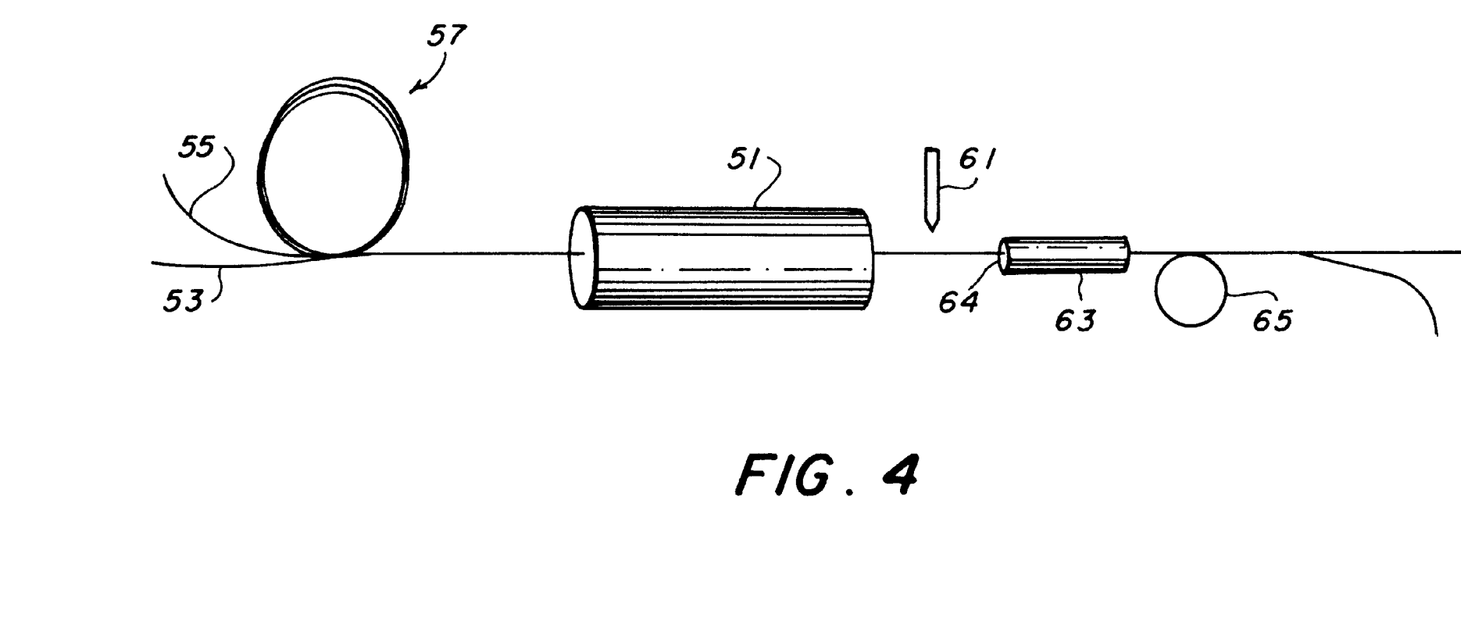
FIG. 4 illustrates an example of how the manufacturing process shown in FIG. 1 can be automated.

Referring now to FIG. 4, the technique discussed in FIGS. 1, 2A, 2B and 3A, 3B and 3C is highly amenable to automation of the manufacturing process, as shown in FIG. 4. Temperature control of the furnace 51 (similar in construction and operation to the furnace 23 in FIG. 1) and tensioning of the fibers 53 and 55 (similar to the fibers 17 and 19 in FIG. 1) can be accomplished through well-established industrial control techniques (not shown) and these controls can even be linked to direct, real-time readout of the coupling ratio from a ratiometer (similar in construction and operation to the ratiometer 45 in FIG. 1). The fibers 53 and 55 can be fed from one or more spools 57 into the furnace 59, while infrared light from an infrared source or a wideband light source (not shown, but similar to the infrared light source 11 of FIG. 11) can be injected into the opposite end of the spool 57, and the heating process is similar to that discussed in regard to FIG. 1. Once the fusion process is complete, a small capstan or takeup spool 65 is the automated means that can be used to pull the fibers 53 and 55 (having been fused to form a coupler) through the furnace 59, optionally into a cell or casing 63 where a protective shell can be cemented around the fibers 53 and 55. When the fibers 53 and 55 have been drawn far enough to allow the desired pigtail length, a cleaving mechanism 61 can be used to separate the finished infrared fiber optic coupler package from the rest of the spool 57. A new casing 63 is then inserted between the furnace 51 and the capstan 65 to allow the process to continue on to the next infrared fiber optic coupler package to be fabricated.

Each time that an infrared fiber optic coupler has been completed (with the fibers 53 and 55 cooled and no longer being stretched), a setting agent 64, such as an epoxy, is inserted into the coupler casing 63 to hold the fibers 53 and 55 in the coupler casing 63 and make the fiber coupler package. Any setting agent is suitable as long as it is relatively quick-hardening and does not significantly absorb light in the wavelength region of operation where the coupler is to be operated.

Figure 5:
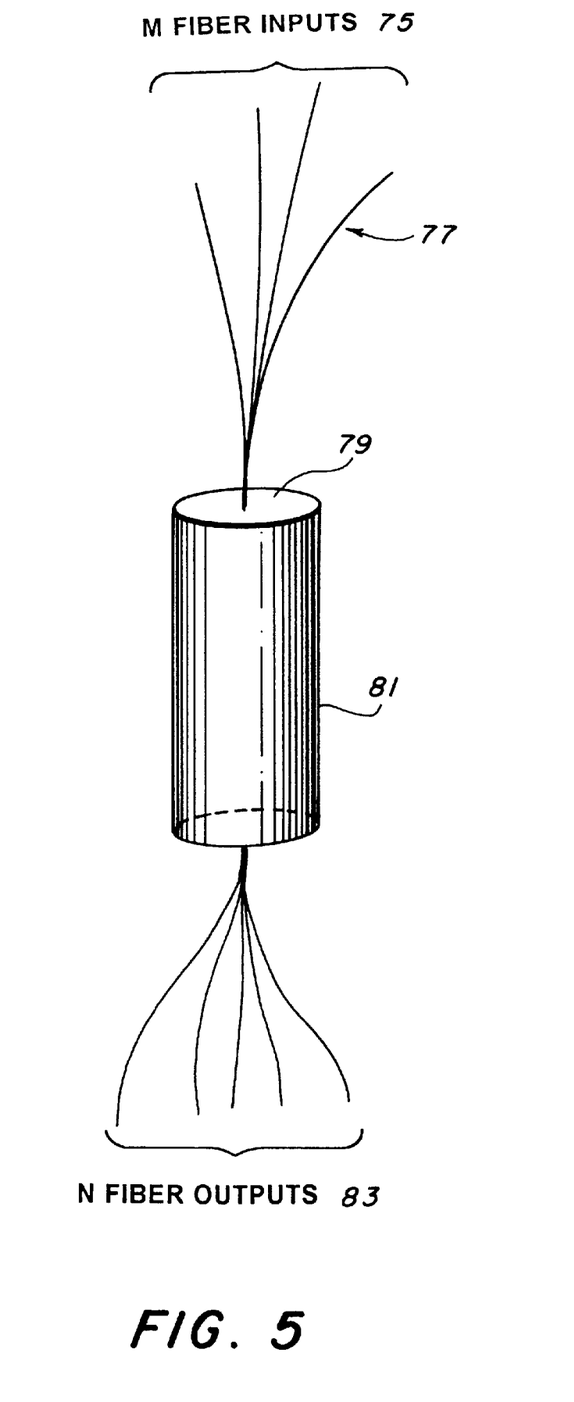
FIG. 5 illustrates an exemplary manufactured MxN infrared optical fiber coupler.

FIG. 5 illustrates an exemplary manufactured MxN infrared optical fiber coupler, showing M fiber inputs 75 held in place inside the coupler 82 by epoxy 79 and with N fiber outputs 83.

ADVANTAGES AND NEW FEATURES OF THE INFRARED OPTICAL FIBER COUPLER

These couplers will allow more sophisticated optical devices in the mid-infrared region. Two examples of possible devices using these couplers are as follows:

EXAMPLE 1

All-Fiber Fourier Transform Infrared Spectrometer (AFFTIR).

By using one or two fiber couplers an interferometer (Michelson or Mach-Zender, respectively) can be made completely from lengths of infrared fiber. One fiber can be stretched slightly using a mechanical system to produce a temporal interferogram. If another length of fiber is exposed to the ambient environment, Fourier transform spectroscopy (FTS) can be achieved using the evanescent coupling from the fiber. FTS is commonly used for chemical sensing, meteorology, solar science, and atmospheric chemistry, among other things.

EXAMPLE 2

Fiber evanescent array detector (FEAD).

With either a cascade network of 1×2 fiber couplers or a single 1×N coupler, an array of evanescent fiber sensors can be fabricated. Such a device would be useful for microtopological monitoring or active sensing of flow streams or even as a multi-wavelength simultaneous probe. This coupler device can be used wherever it is required to split a single infrared beam into two or more, using low-loss infrared fiber with a highly adjustable numerical aperture.

ALTERNATIVES

An optical fiber coupler can be made from chalcogenide glass simply by connecting two core-only fibers using heat shrink material. However, such a device nearly eliminates the advantage of these infrared fibers, since core-only fiber has very high losses, and does not achieve a high coupling ratio (experimentally, less than 6:1). It is also not amenable to singlemode fiber.

The same effect can be achieved without using fiber and resorting to free-space or bulk waveguide optics. This technique, which is the current state of the art, suffers from high scattering and/or injection losses, as well as problems with atmospheric absorption of the infrared signal and does not lend itself as easily to miniaturization or environmental ruggedness and may not be as economically feasible as a fiber device.

Therefore, what has been described in preferred embodiments of the invention is an infrared fiber optic coupler and a method for making an infrared fiber optic coupler. The method comprises the steps of: braiding first and second infrared transmitting glass fibers to form first and second arms of the infrared fiber optic coupler; inserting the braided first and second infrared transmitting glass fibers through a furnace; securing the braided glass fibers by two clamping mechanisms on first and second sides of the furnace; purging the furnace of water vapor and oxygen with a steady flow of inert gas through the furnace; allowing infrared light pulses to pass through one of the first and second arms of the coupler; detecting the infrared signals from the first and second arms of the coupler in first and second infrared detectors; comparing the detected signals to develop a coupling ratio between the first and second arms of the coupler; turning the furnace on to heat the first and second braided glass fibers to the point where the glass fibers begin to darken in color; translating the second clamping mechanism to produce a tautness on the first and second braided glass fibers until the desired coupling ratio has been achieved; turning the furnace off; and maintaining tension on the first and second braided glass fibers until the fibers cool to rigidity; and turning off the inert gas flow.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured by Letters Patent of the United States is:

1. An infrared fiber optic coupler comprising:
    first and second braided infrared transmitting glass fibers both selected from the group consisting of chalcogenide glass fibers, chalcohalide glass fibers, chalcogenide glass fibers doped with rare earths or transition metals; and chalcohalide glass fibers doped with rare earths or transition metals; and
    said first and second braided infrared transmitting glass fibers having first and second arms and being fused together with heat to form a desired coupling ratio between the first and second arms of the coupler.

2. An infrared fiber optic coupler package comprising:
    first and second braided infrared transmitting glass fibers both selected from the group consisting of chalcogenide glass fibers, chalcohalide glass fibers, chalcogenide glass fibers doped with rare earths or transition metals; and chalcohalide glass fibers doped with rare earths or transition metals;
    said first and second braided infrared transmitting glass fibers having first and second arms and being fused together with heat to form a desired coupling ratio between the first and second arms of the coupler;
    a casing enclosing said fiber optic coupler; and
    a setting agent inserted into said casing to hold said fiber optic coupler firmly inside said casing.

3. A method of making an infrared fiber optic coupler within the wavelength range from about 1.5 to about 12 microns comprising the steps of:
    braiding at least first and second infrared transmitting glass fibers to form at least first and second arms of the infrared fiber optic coupler;
    inserting the braided first and second infrared transmitting glass fibers through a furnace;
    securing the braided glass fibers by two clamping mechanisms on first and second sides of the furnace;
    purging the furnace of water vapor and oxygen with a steady flow of inert gas through the furnace;
    allowing infrared light to pass through one of the first and second arms of the coupler;
    detecting the infrared signals from the first and second arms of the coupler in first and second infrared detectors;
    comparing the detected signals to develop a coupling ratio between the first and second arms of the coupler;
    translating the second clamping mechanism to produce a tautness on the first and second braided glass fibers;
    turning the furnace on to heat the first and second braided glass fibers to the point where the glass fibers begin to darken in color;
    translating the second clamping mechanism to maintain a tautness on the first and second braided glass fibers until the desired coupling ratio has been achieved;
    turning the furnace off;
    maintaining tension for tautness on the first and second braided glass fibers until the fibers cool to rigidity;
    turning the gas flow off; and
    obtaining the infrared fiber optic coupler by removing the two clamping mechanisms, the furnace, and the first and second detectors.

4. The method of making an infrared fiber optic coupler of claim 3 wherein said braiding step includes the step of:
    utilizing core clad first and second infrared transmitting glass fibers to form the first and second arms of the infrared fiber optic coupler.

5. The method of making an infrared fiber optic coupler of claim 3 wherein said braiding step includes the step of:
    utilizing first and second infrared transmitting chalcogenide glass fibers to form the first and second arms of the infrared fiber optic coupler.

6. The method of making an infrared fiber optic coupler of claim 5 wherein the chalcogenide glass fibers are single mode fibers.

7. The method of making an infrared fiber optic coupler of claim 5 wherein the chalcogenide glass fibers are multimode fibers.

8. The method of making an infrared fiber optic coupler of claim 3 wherein said braiding step includes the step of:
    utilizing first and second infrared transmitting chalcohalide glass fibers to form the first and second arms of the infrared fiber optic coupler.

9. The method of making an infrared fiber optic coupler of claim 8 wherein the chalcohalide glass fibers are single mode fibers.

10. The method of making an infrared fiber optic coupler of claim 8 wherein the chalcohalide glass fibers are multimode fibers.

11. The method of making an infrared fiber optic coupler of claim 3 wherein said allowing step includes the steps of:
    utilizing an F-center laser to produce infrared light; and
    modulating the infrared light.

12. The method of making an infrared fiber optic coupler of claim 5 wherein said utilizing step includes the step of:
    producing the infrared light at a wavelength of about 2.65 $\mu$m.

13. The method of making an infrared fiber optic coupler of claim 3 wherein said inserting step includes the step of:
    using a tube with a coil wrapped around the outside of the tube as the furnace.

14. The method of making an infrared fiber optic coupler of claim 13 wherein said step of turning the furnace on includes the step of:
    coupling the ends of the coil to a DC current supply to heat the first and second braided fibers.

15. The method of making an infrared fiber optic coupler of claim 3 wherein:
    said braiding step includes the step of:
        utilizing core clad first and second infrared transmitting glass fibers to form the first and second arms of the infrared fiber optic coupler;
    said inserting step includes the step of:
        using a tube with a coil wrapped around the outside of the tube as the furnace; and
    said step of turning the furnace on includes the step of:
        coupling the ends of the coil to a DC current supply to heat the first and second braided fibers.

16. The method of making an infrared fiber optic coupler of claim 15 wherein said allowing step includes the steps of:

utilizing an F-center laser to produce infrared light; and
modulating the infrared light.

17. The method of making an infrared fiber optic coupler of claim 16 wherein said utilizing step includes the step of: producing the infrared light at a wavelength of about 2.65 μm.

* * * * *

UNITED STATES PATENT AND TRADEMARK OFFICE
CERTIFICATE OF CORRECTION

PATENT NO. : 5,949,935
DATED : Sep. 7, 1999
INVENTOR(S) : David T. Schaafsma, et al It is certified that error appears in the above-identified patent and that said Letters Patent is hereby corrected as shown below:

On title page, item [75] add the following:

--Ishwar D. Aggarwal--

Signed and Sealed this

Twelfth Day of September, 2000

*Attest:*

Q. TODD DICKINSON

*Attesting Officer*     *Director of Patents and Trademarks*